United States Patent [19]

Wills

[11] Patent Number: 4,791,434

[45] Date of Patent: Dec. 13, 1988

[54] DROPLET STREAM ALIGNMENT FOR JET PRINTERS

[75] Inventor: Leslie J. Wills, Lidcombe, Australia

[73] Assignee: Commonwealth Scientific and Industrial Research Organization, Australia

[21] Appl. No.: 897,007

[22] PCT Filed: Nov. 12, 1985

[86] PCT No.: PCT/AU85/00277

§ 371 Date: Jul. 10, 1986

§ 102(e) Date: Jul. 10, 1986

[87] PCT Pub. No.: WO86/02959

PCT Pub. Date: May 22, 1986

[30] Foreign Application Priority Data

Nov. 12, 1984 [AU] Australia .................................. 8071

[51] Int. Cl.[4] .......................................... G01D 15/18

[52] U.S. Cl. .................................. 346/75; 68/205 R; 239/587; 239/690; 346/140 R

[58] Field of Search ............. 68/205 R; 239/587, 690, 239/708; 346/75, 140 R

[56] References Cited

U.S. PATENT DOCUMENTS

| | | | |
|---|---|---|---|
| 3,563,471 | 2/1971 | Watkin | 239/587 X |
| 3,564,120 | 2/1971 | Taylor | 346/75 X |
| 3,947,851 | 3/1976 | Chen et al. | 346/75 X |
| 4,160,982 | 7/1979 | Keur | 346/140 IJ |
| 4,277,790 | 7/1981 | Heibein et al. | 346/75 |

FOREIGN PATENT DOCUMENTS

| | | | |
|---|---|---|---|
| 33958 | 4/1981 | Japan | 346/75 |

OTHER PUBLICATIONS

IBM Technical Disclosure Bulletin, vol. 15, No. 9, Feb. 1973, pp. 2787 & 2788.

*Primary Examiner*—Philip R. Coe

*Attorney, Agent, or Firm*—Sughrue, Mion, Zinn, Macpeak & Seas

[57] ABSTRACT

To permit accurate adjustment of the direction of projection of droplets from a droplet generating head of a jet printer, the jet body is mounted for rotational movement in a cradle formed on, or on an arm member extending from, a support body. Charging electrodes can also be mounted on, or on an arm member extending from, the support body. The support body can be mounted on a shaft in the jet printer. Arrays of droplet generating heads can be formed by supporting a plurality of heads on a single shaft, or by constructing a plurality of support bodies from a single block of electrically insulating material.

8 Claims, 4 Drawing Sheets

DROPLET STREAM ALIGNMENT FOR JET PRINTERS

TECHNICAL FIELD

This invention concerns jet printing. More particularly, it concerns mounting arrangements for individual printing heads which enable a plurality of individual printing heads to be positioned side by side in jet printing equipment with their droplet jets correctly aligned.

One example of the sort of jet printing apparatus in which the present invention may be used is described in the specification of Australian Patent No. 502,523. However, it should be appreciated that the present invention may be used in other forms of jet printer.

BACKGROUND ART

Those who have used a jet printer of the type described in Australian patent specification No. 502,523 will be aware that if it is desired to produce a pattern on a fabric using dots which are formed by droplets from a number of droplet streams, with each droplet stream issuing from a separate orifice, then accurate alignment of the droplet streams and careful positioning of the droplet generators must be achieved and maintained. The achievement of the necessary alignment of the droplet stream has always been a lengthy, tedious and difficult task and, with the prior art jet printing equipment, the correct alignment has been difficult to maintain. The need for constant re-adjustment of the jet printing equipment has been a significant factor in the labour costs associated with the operation of jet printing equipment, and is one of the reasons why fabric having designs printed on it with such equipment remains expensive, notwithstanding recent technical advances in jet printing.

One method of ensuring the correct relative positioning of the droplet streams in a jet printer is to mount each jet body so that when there is zero charge on the droplets, they fall into a small opening in a collector (also called a trap or a gutter) which has been accurately positioned relative to neighbouring collectors in the jet printer. Since it is difficult to design droplet generating heads which will always produce a stream of droplets that enter their respective collectors in the absence of a charge on the droplets, some form of adjustment mechanism for the generating heads must be provided. It is a further requirement, for the most effective jet printing, that the scan amplitude of the droplet streams is either controlled or adjustable, to enable the maximum deflection of one droplet stream to be in exact registration with the minimum deflection of the next droplet stream.

For a single jet, it is possible to design a control mechanism for the jet which enables the jet stream to be precisely aligned to a required specification. But when a plurality of droplet generators are to be mounted close to each other in an array in a jet printer, the limited space available for the array of droplet generators and the need for all the adjustments to be made independently, make such designs impractical. Simple scaling down of the size of a single jet adjuster is not appropriate because the adjuster must have a certain robustness in order to maintain mechanical stability.

Another point well known to engineers who service jet printing equipment of this type is that although it is a relatively easy matter to place an orifice mount so that the aperture for the stream of droplets is precisely positioned, the same specifications of accuracy cannot be achieved with the stream axis orientation.

An analysis of the problems discussed above has shown that since the aim error of a droplet stream may be in any direction relative to the jet body axis, then two-dimensional planar correction of the aiming point is necessary. Such adjustments are possible with ball and socket joints or with universal joint arrangements, but sufficient accuracy and stability of the joints are difficult to maintain in the small sizes required. A further disadvantage of adjustment systems using such joints is evident when the droplet generating heads must be closely spaced in a linear array. In such a case, the spacing of the droplet generating heads would have to be greater than would be necessary if tilting of the generating heads using such joints were not required. Another disadvantage of such a system is that the jet or stream of droplets from the generating head may not be correctly aligned with the axis of the charge electrode when the droplet generating head is tilted. Such misalignment errors are known to contribute to charge electrode wetting by satellite drops, and to variability in the sensitivity of deflection.

DISCLOSURE OF THE PRESENT INVENTION

It is an objective of the present invention to overcome these shortcomings of the prior art and provide simple, but effective, apparatus which permits droplet generators to be positioned in a closely-spaced array, with their droplet streams correctly aligned.

This objective is achieved by mounting an assembly which includes the droplet generating head (such an assembly is known as the jet body of the printer) in a cradle which allows rotation of the jet body relative to a mounting body, and providing for the mounting body to be secured to a shaft in the jet printer which runs perpendicular to the direction at which the droplets are projected from the jet body.

According to the present invention, there is provided an apparatus for use in supporting the jet body of a jet printer, said apparatus comprising a support body having a cradle formed thereon or attached to an arm member extending therefrom, said support body being adapted to be mounted in the jet printer as part of an array of printing heads, the cradle being adapted to position the jet body in a location such that droplets from the jet body are directed generally in a direction which is perpendicular to a surface to be printed by the jet printer, the jet body being adapted to be rotated with respect to the cradle about an axis which is parallel to said direction.

Preferably, a charging electrode, for inducing a charge on droplets from the jet body, is also mounted on the support body, close to the cradle.

The present invention also encompasses a jet printing equipment which incorporates the apparatus of the present invention.

The various features of the present invention will be better understood from the following description of the operation of jet printers and of two embodiments of the present invention. In the following description, reference will be made to the accompanying drawings.

DETAILED DESCRIPTION OF THE ILLUSTRATED EMBODIMENTS

Figure 1:
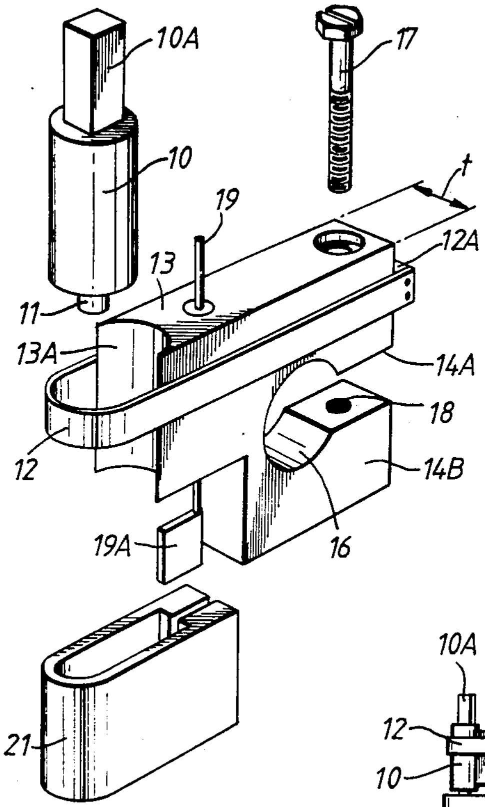
FIG. 1 is a perspective sketch of one form of jet body support in partly exploded form.
Figure 2:
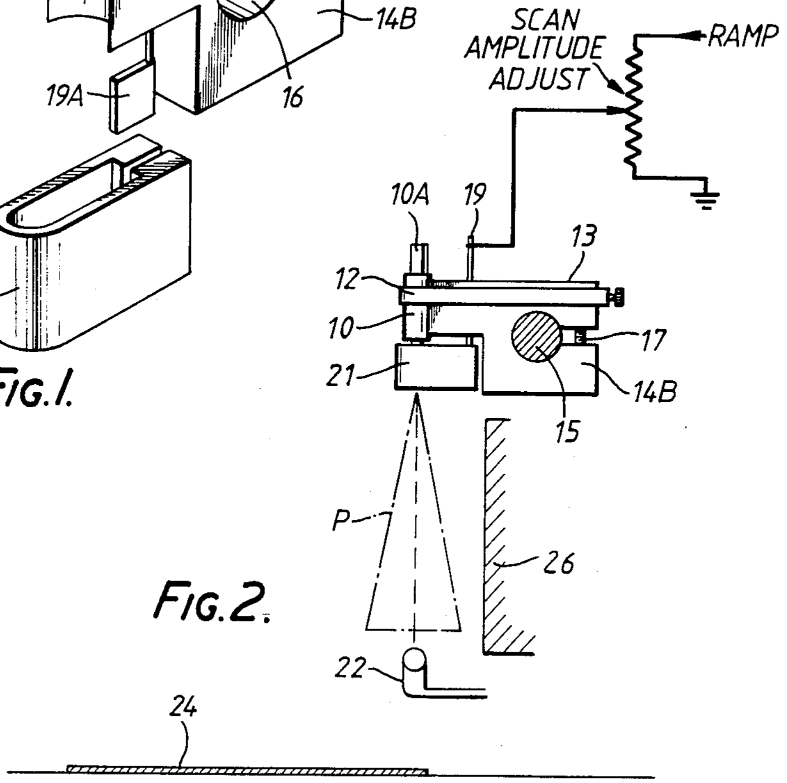
FIG. 2 is a schematic diagram of the droplet generating, collecting and printing features of a jet printer which incorporates the assembly of FIG. 1.
Figure 3:
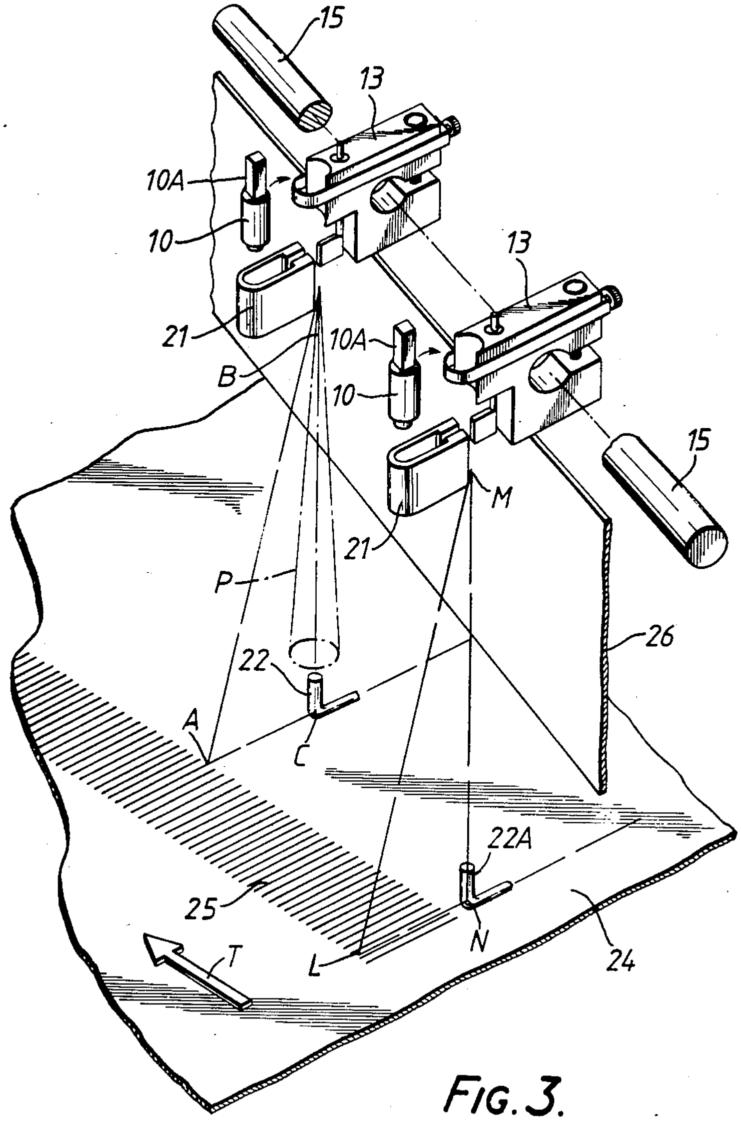
FIG. 3 is a view (partly third angle, partly schematic, and partly exploded) of an array of alignment adjusters in a jet printer, including geometrical constructions that are used to explain the operation of the present invention.

Referring to FIGS. 1, 2 and 3, the droplet generating head of a jet printer and its immediately associated components are included in a jet body 10. The orifice mount 11 of the droplet generated head supports an orifice (not shown) having an aperture which produces the stream of droplets. The orifice mount 11 projects slightly below the bottom of the jet body 10.

The jet body 10 is held against the curved surface or cradle 13A of a mounting body 13 by a strap 12. The strap 12 illustrated in FIGS. 1, 2 and 3 is formed by a metal strip which has its ends joined by a metal plate or block 12A. Metal block 12A is preferably fitted with a threaded aperture, through which a clamping screw passes, to bear against the flat end face of the mounting body 13 that is adjacent to block 12A.

Alternative strap arrangements may be used, including straps formed of wire, which encircle the mounting body 13 and are attached to pins on the mounting body 13, or are clamped into notches or grooves formed in the mounting body 13. Such alternative strap structures will rely upon a spring bias built into the wire assembly to hold the jet body 10 firmly against the curved cradle 13A of the mounting body 13. Thus they do not require a clamping screw for their effectiveness and avoid one extra adjustment that is necessary with the illustrated embodiment of FIG. 1.

The mounting body 13 is made from an electrically insulating material and is provided with a clamping arrangement which enables it to be mounted, as shown in FIGS. 2 and 3, on a shaft 15 which runs perpendicular to the intended plane of scan of the droplets in the droplet stream from the aperture at the end of orifice mount 11. In the embodiment illustrated in FIGS. 1, 2 and 3, the clamping mechanism comprises a generally keyhole shaped arrangement formed by a circular aperture 16 adapted to fit around shaft 15, a set of jaws 14A and 14B, and a bolt 17 passing through a clearance hole in jaw 14A and into a threaded bolt-receiving hole 18 in jaw 14B.

The aperture of a collector, trap or gutter 22 for undeflected droplets in the stream of droplets from the aperture of orifice mount 11 lies directly below the aperture in orifice mount 11 (see FIG. 2).

The jet body 10 is rotatable within the cradle 13A, using a tool adapted to engage the square section extension 10A which extends from the top of the jet body 10. In the illustrated embodiment of FIG. 1, when the jet body has been firmly held against the cradle 13A by strap 12, it is necessary to loosen the clamping screw of the strap 12 before the jet body 10 can be rotated, and to re-clamp the strap after the jet body has been correctly positioned.

The mounting body 13 illustrated in FIG. 1 also contains an electrically conducting rod 19, which passes through the body 13 to provide an electrical connection to a spade 19A formed at, or mounted on, the end of rod 19. Spade 19A supports a charging electrode 21. When the jet printer is in use, the rod 19 is connected to the electrode charging signal source arrangement of the jet printer.

Referring now to FIGS. 2 and 3, it will be clear that if the jet body is not properly aligned in the jet printer, rotation of the jet body 10 about a vertical axis (vertical only in relation to the illustrated embodiment; in practice, the jet of droplets may be projected from an orifice mount 11 in any required orientation, including horizontally) will cause the undeflected droplet stream to map out a cone P. If the jet body 10 is correctly aligned, however, all undeflected droplets will enter the aperture of the associated collector, trap or gutter 22 of the droplet generating assembly.

To correctly align the droplets in the stream from the aperture or orifice in orifice mount 11, the jet body 10 is rotated until the droplet trajectory lies in the forwardly projecting plane of the droplets (this plane is shown by triangles ABC and LMN in FIG. 3) and is best observed by adjusting the stream to the frontal edge of the collector. This plane is necessarily in the same plane as the centre of the collector 22, and orthogonal to the deflection plate 26. This plane also includes the centre or axis of the charge electrodes and ensures centrality of the jet stream in the charge electrode 21. The mounting body 13 is then tilted by unclamping it and moving it around the shaft 15 until the undeflected droplets of the jet enter the centre of the receiving aperture of collector 22. It is then re-clamped. The jet body is now correctly aligned in the jet printer and further rotation of the jet body 10 will result in all the undeflected droplets from the aperture in orifice 11 entering the collector 22.

Since rotation of the droplet head 10 (using extension 10A) and the unclamping, tilting and re-clamping of body 13 can be effected using instruments which are smaller in transverse dimension than the lateral dimension t of the mounting body 13 (see FIG. 1), it will be appreciated that the droplet generating heads of the jet printer can be mounted as a closely spaced array of the shaft 15.

It will also be appreciated that the apparatus illustrated in FIG. 1, and included in the equipment of FIGS. 2 and 3, is but one example of a useful printing head.

Figure 4:
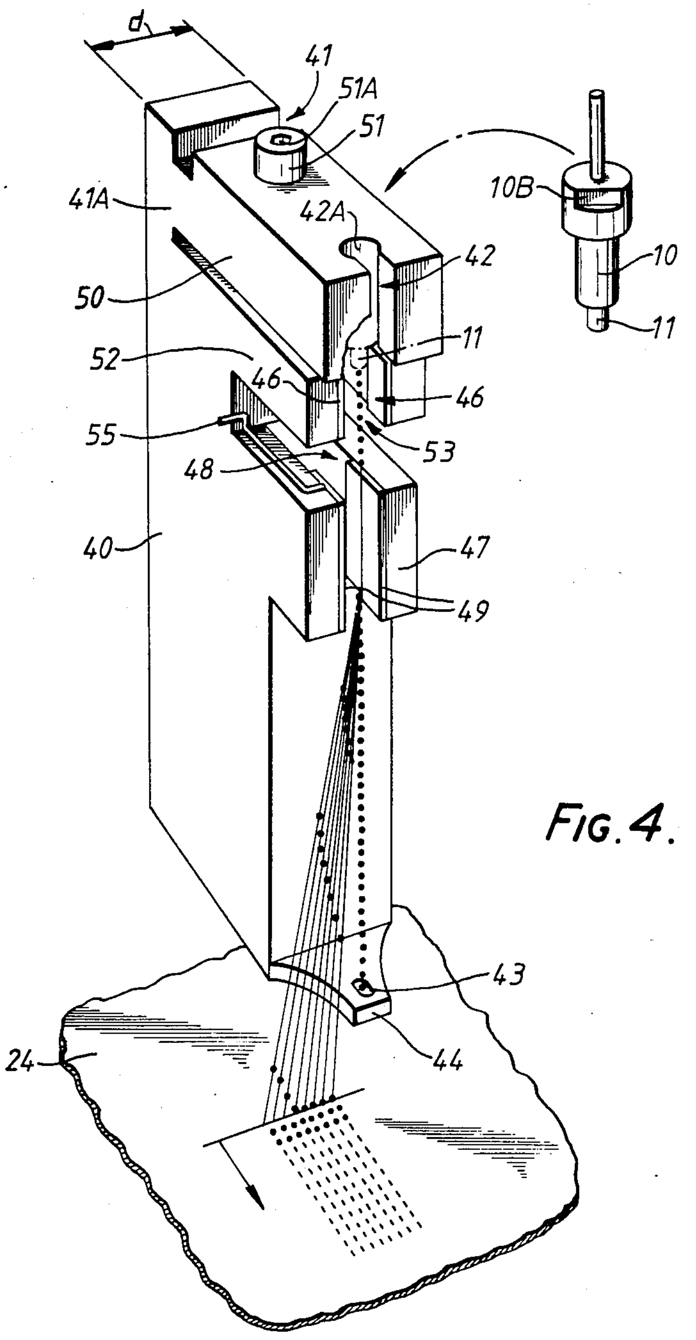
FIG. 4 illustrates an embodiment of the present invention.

An alternative arrangement, which constitutes a preferred embodiment of the present invention, is illustrated in FIG. 4 This embodiment of the present invention has a support body 40 which is formed as a single block of a rigid plastics material (such as the material marketed under the trade mark "DELRIN").

An upper arm 50 extends forwardly from the body 40 and has a keyhole shaped slot 42 at its end remote from the main portion of body 40. Slot 42 has an inner surface 42A which is substantially circular in horizontal cross-section and which acts as a cradle for the cylindrical jet body 10. Jet body 10 is a press fit into the cradle 42A and, when pressed into position, can be adjusted so that the undeflected droplets in the droplet stream from the aperture of the orifice mount 11 are projected directly to a collector aperture 43 in a lowermost extension 44 of the body 40. This adjustment is performed by rotating jet body 10 until the undeflected droplet stream is positioned in the forwardly projecting vertical plane (as described for the first shown embodiments in FIGS. 1, 2 and 3).

Rotation of jet body 10 within the cradle of projecting arm 50 can be performed by means of an adjusting tool which engages the upper flat sections 1OB formed on the jet body for this purpose.

A transverse slot 41 is formed at the end of arm 50 which is connected to the body 40. Slot 41 is dimensioned to provide a cantilever hinge 41A which allows a "nodding" adjustment of the jet body 10 in a vertical plane. The nodding adjustment is effected using a set screw 51 which passes through a hole extending vertically through the upper arm 50 to engage a threaded hole formed in the main portion of body 40 immediately below the hole extending through arm 50. When the set screw 51 is tightened, using an Allen key inserted into a hexagonal recess 51A in the upper surface of set screw 51, it draws arm 50 down towards the main body 40. The centre line of the cradle region 42A should be just forward of the vertical centre line through collector 43, so that there will always be some tension in the set screw 51 when the jet printer is operating.

A second arm 52 extends forward from the body 40 immediately below the upper arm 50. A pair of charge electrodes 46 are positioned on each side of a slot 53 formed vertically in arm 52. The charging electrodes 46 are connected by leads extending through the body 40 to the droplet charging voltage supply (not shown). Since the jet body 10 is mounted with the orifice mount 11 just above, or projecting into, the middle of the space between the charging electrodes 46, the droplets leaving the aperture of orifice mount 11 are charged (if a charged droplet is required) at substantially the instant that the droplets break off from the orifice mount.

As an alternative to electrodes 46, the charging electrode may comprise a U-shaped electrode which is a friction fit in slot 53. Such a charging electrode is featured as charging electrode 46 in the droplet generating heads illustrated in FIG. 5.

Beneath arm 52 is a third arm 47, which also extends forward of the body 40. Arm 47 has a vertical slot 48 formed in its end which is remote from the body 40. Slot 48 is aligned with slots 42 and 53, and with collector aperture 43, so that an undeflected droplet leaving the aperture of orifice mount 11 and passing through slots 42 and 53 to collector aperture 43 will pass through the central plane of slot 48.

Deflecting electrodes 49 are positioned on the ends of the facing walls of slot 48 which are remote from body 40. Electrodes 49 may be printed on to the surface of the walls of slot 48, with the connection between the electrodes 49 and the voltage source which establishes the deflecting field being by wires which pass through the mounting body 40. In the illustrated embodiment of FIG. 4, however, a lead 55 to one of the electrodes 49 is shown passing along the top of arm 47. Lead 55 will be connected to the deflection voltage control unit. The corresponding lead to the other electrode 49 follows a similar path on the other (lower) side of arm 47. By connecting the lead 55 of a number of mounting bodies to a single lead from the voltage supply for the deflecting field, it is a relatively straightforward matter to apply the same deflecting field to a plurality of sets of electrodes 49 on respective mounting bodies.

An advantage of the embodiment of the invention that is illustrated in FIG. 4 is that the charged droplets can be subjected to a short, intense deflecting field, and then have a long coasting distance before striking the fabric 24 (or other object) that is to be printed. This enables more accurate printing to be achieved since impact of the droplets on the printing substrate with this deflection geometry is close to perpendicular and printing distortion due to changes in printing substrate thickness is minimised with negligible variation in effective scan width.

Figure 5:
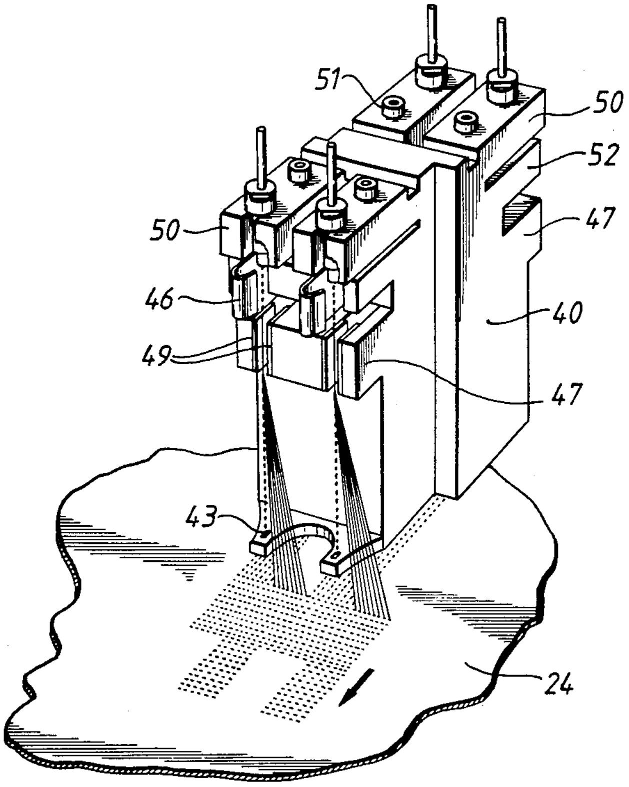
FIG. 5 shows how a double array of printing heads of the type featured in FIG. 4 may be created from a single block of insulating material.

This embodiment also overcomes one of the problems that has been experienced with the embodiment of FIGS. 1, 2 and 3, namely, a lack in stability of the droplet path, which was found to be related to the tightening the clamping bolt 17 (see FIG. 1). The accuracy of the mounting of the electrodes in the arrangement of FIGS. 4 and 5 is also improved, compared with the electrode mounting in the embodiment of FIGS. 1, 2 and 3.

Reverting now to the embodiment of FIGS. 1, 2 and 3, it will be appreciated by those skilled in this art that, as shown in the specification of Australian Patent No. 502,523, jet printing equipment may have arrays of jets which are angled relative to the direction of travel of the material being printed. It will be clear that with such arrangements, good patterns will be printed only if the scan of the droplets is such that the maximum deflection of a droplet from one droplet generating head is immediately alongside the minimum deflection of a droplet from the adjacent droplet generating head.

This feature is shown in FIG. 3, where the arrow T indicates the direction of travel of a surface 24 (for example, a length of textile material) and the lines 25 indicate (schematically) the possible scans of droplets falling on the surface 24 from the droplet generating head positioned above collector 22A.

A good pattern production is required, droplets from the droplet generating head positioned above the collector 22A must be controlled so that the droplet which is deflected when maximum charge is applied to the relevant deflecting electrode 21 falls upon surface 24 immediately adjacent to the region of printing of surface 24 by droplets from the other droplet generating head. This scan control can be effected by adjustment of the potentiometer that conventionally controls the slope of the ramp voltage that is applied to the droplet charging electrode 21.

If the embodiment of FIG. 4 is used, an array of printing heads may be established by mounting a plurality of printing heads alongside each other, on a rectangular rod that extends perpendicular to the direction of movement of the fabric underneath the printing heads. If space for adjustment of the jet body 10 is required, the printing heads may be mounted on two transverse rods, with the individual heads separated from each other by a distance which is approximately d of FIG. 4.

As an alternative to mounting a plurality of printing heads of the type illustrated in FIG. 4 on one or more rods, a plurality of the printing heads may be formed from a single block of insulating material, to be adjacent to each other. Another alternative is to create two linear arrays of printing heads, back to back, from a single block of insulating material, as shown in FIG. 5. In the embodiment of FIG. 5, the printing heads of one array are positioned to be mid-way between the printing heads of the other array.

Advantages to be gained by adopting the embodiment of FIG. 5 include a reduced packing density of the jet arrangements (giving better access for maintenance) and a reduced droplet scan (resulting in more accurate printing).

Other modifications to the jet printing apparatus incorporating the present invention, or constructed in accordance with the present invention, may be made without departing from the present inventive concept.

INDUSTRIAL APPLICABILITY

The present invention is particularly suited for use in jet printers for printing detailed patterns on fabrics and the like, where accurate placement on the printing droplet on the fabric is of paramount importance. However, the invention can also be used, with benefit, in jet printers where the accuracy of the drop placement is less critical in the printing process.

I claim:

1. A printing head for a jet printer comprising:

(a) a support body extending generally in a first direction which is perpendicular to a surface to be printed, a first slot formed in a top surface of the support body for mounting the support body in a jet printer, said slot extending substantially at right angles to said first direction;

(b) an elongated first arm member extending in a second direction perpendicular to said first direction from an upper region of the support body adjacent said top surface;

(c) a generally cylindrical cradle formed at an end of the first arm member which is remote from the support body, said cradle having an axis parallel to said first direction and at right angles to said second direction;

(d) a jet body having an elongated cylindrical shape at one end of which is located an orifice from which droplets are projected, said jet body having a snug fit within said cradle;

(e) a second arm member extending from the support body in said second direction and below said first arm member, said second arm member having a second slot formed at an end of the second arm member which is remote from the support body, said second slot extending parallel to the axis of the cradle, charging electrode means mounted on said second arm member within said second slot, for charging droplets projected from said orifice into the region of influence of said charging electrode means; and (f) a third arm member extending from the support member in said second direction and below said second arm member, said third arm member having a third slot formed in an end of the third arm member which is remote from the support body, said third slot extending in a direction parallel to the axis of the cradle, a pair of planar deflection electrodes mounted on opposed faces of said third slot, for deflecting charged droplets projected between the deflection electrodes after leaving the region of influence of said charging electrode means.

2. A printing head as defined in claim 1, including adjustment means to adjust the orientation of said first arm member relative to said support body.

3. A printing head as defined in claim 2, in which said adjustment means is a set screw.

4. A printing head as defined in claim 2, including a collector for uncharged droplets which pass between said deflecting electrodes, said collector being formed integrally with said support body and having an aperture for receiving said uncharged droplets.

5. A printing head as defined in claim 2, in which said jet body has flat faces in an end portion thereof which is remote from said orifice and which extends beyond said cradle, for facilitating the rotation of the jet body within said cradle.

6. A printing head as defined in claim 1, in which said charging electrode means comprises a pair of planar electrodes, mounted on opposed faces of said second slot.

7. A printing head as defined in claim 1, in which said charging electrode means comprises a generally U-shaped electrode having a friction fit within said second slot.

8. A printing head as defined in claim 1, further comprising additional sets of said arm members extending from said support body to provide multiple jet printing.

* * * * *